(12) United States Patent
Lewallen

(10) Patent No.: US 6,868,840 B2
(45) Date of Patent: Mar. 22, 2005

(54) CHARGED AIR INTAKE SYSTEM FOR AN INTERNAL COMBUSTION ENGINE

(75) Inventor: Brian Andrew Lewallen, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 10/454,887

(22) Filed: Jun. 5, 2003

(65) Prior Publication Data

US 2004/0244782 A1 Dec. 9, 2004

(51) Int. Cl.⁷ .......................... F02B 29/04; F02B 33/44; F02M 25/07
(52) U.S. Cl. ..................... 123/563; 123/568.12; 60/599; 60/605.2
(58) Field of Search .............................. 123/559.1, 563, 123/568.11, 568.12, 568.15, 568.17, 568.18, 568.19, 568.21; 60/599, 600, 605.2, 611

(56) References Cited

U.S. PATENT DOCUMENTS

| | | | |
|---|---|---|---|
| 3,752,132 A | 8/1973 | Bentz et al. | |
| 4,180,032 A | 12/1979 | Plegat | |
| 4,317,439 A | 3/1982 | Emmerling | |
| 4,350,135 A | 9/1982 | Casey et al. | |
| 4,426,985 A | 1/1984 | Kanesaka | |
| 4,556,038 A | 12/1985 | Okamoto et al. | |
| 4,815,437 A | 3/1989 | Regar | |
| 4,827,890 A | 5/1989 | Pociask et al. | |
| 4,873,961 A | 10/1989 | Tanaka | |
| 4,956,973 A | 9/1990 | Fortnagel et al. | |
| 5,003,957 A | 4/1991 | Takeda | |
| 5,119,795 A | 6/1992 | Goto et al. | |
| 5,133,327 A | 7/1992 | Hirosawa et al. | |
| 5,142,866 A | 9/1992 | Yanagihara et al. | |
| 5,291,871 A | 3/1994 | Shirai | |

(List continued on next page.)

FOREIGN PATENT DOCUMENTS

| | | | | |
|---|---|---|---|---|
| JP | 57195820 A | * | 12/1982 | .................. 60/599 |
| JP | 61058918 A | * | 3/1986 | .................. 60/599 |
| JP | 1998 10-246117 | | 9/1998 | |
| JP | 1999 11-343856 | | 12/1999 | |
| JP | 2000 64845 | | 2/2000 | |
| JP | 2001 82259 | | 3/2001 | |

*Primary Examiner*—Willis R. Wolfe, Jr.
(74) *Attorney, Agent, or Firm*—Reising Ethington Barnes Kisselle P.C

(57) ABSTRACT

A charge air intake system for a diesel engine (10) includes a first duct (24) and second bypass duct (30) having its upstream and downstream ends connected to the first duct and bypassing a charge air cooler (28) mounted in line with the first duct (24). An EGR conduit (38) leads from the exhaust manifold to the bypass duct (30). A turbo charger furnished charged air to the ducts where a proportioning valve (26) proportions air between the charge air cooler and the bypass duct.

13 Claims, 1 Drawing Sheet

U.S. PATENT DOCUMENTS

| | | | |
|---|---|---|---|
| 5,385,019 A * | 1/1995 | Kulig et al. ................... 60/599 |
| 5,425,239 A | 6/1995 | Gobert |
| 5,617,726 A | 4/1997 | Sheridan et al. |
| 5,649,516 A * | 7/1997 | Laveran ...................... 123/563 |
| 5,669,363 A | 9/1997 | Francis |
| 5,794,445 A | 8/1998 | Dungner |
| 6,003,316 A | 12/1999 | Baert et al. |
| 6,006,731 A | 12/1999 | Uzkan |
| 6,021,764 A | 2/2000 | Koyama |
| 6,055,966 A | 5/2000 | Zentgraf |
| 6,062,026 A | 5/2000 | Woollenweber et al. |
| 6,138,648 A | 10/2000 | Zentgraf |
| 6,145,313 A | 11/2000 | Arnold |
| 6,145,497 A | 11/2000 | Kervagoret et al. |
| 6,167,703 B1 * | 1/2001 | Rumez et al. ................. 60/599 |
| 6,205,785 B1 | 3/2001 | Coleman |
| 6,227,179 B1 | 5/2001 | Eiermann et al. |
| 6,227,180 B1 | 5/2001 | Hoffmann et al. |
| 6,263,672 B1 | 7/2001 | Roby et al. |
| 6,273,076 B1 | 8/2001 | Beck et al. |
| 6,276,334 B1 | 8/2001 | Flynn et al. |
| 6,286,482 B1 | 9/2001 | Flynn et al. |
| 6,301,887 B1 * | 10/2001 | Gorel et al. ............... 60/605.2 |
| 6,324,847 B1 | 12/2001 | Pierpont |
| 6,334,436 B1 | 1/2002 | Paffrath et al. |
| 6,336,447 B1 | 1/2002 | Bartel et al. |
| 6,351,946 B1 | 3/2002 | Faletti |
| 6,354,084 B1 | 3/2002 | McKinley et al. |
| 6,363,721 B1 * | 4/2002 | Prenninger et al. ........... 60/611 |
| 6,367,256 B1 | 4/2002 | McKee |
| 6,378,506 B1 | 4/2002 | Suhre et al. |
| 6,408,832 B1 | 6/2002 | Christiansen |
| 6,474,323 B1 | 11/2002 | Beck et al. |
| 6,502,397 B1 | 1/2003 | Lundqvist |
| 2002/0069859 A1 | 6/2002 | Hasegawa et al. |
| 2002/0088230 A1 | 7/2002 | Coleman et al. |
| 2002/0088231 A1 | 7/2002 | Coleman et al. |
| 2002/0100280 A1 | 8/2002 | McKinley et al. |
| 2002/0112478 A1 | 8/2002 | Pfluger |
| 2002/0189256 A1 | 12/2002 | Kalish |
| 2002/0195086 A1 | 12/2002 | Beck et al. |
| 2002/0195090 A1 | 12/2002 | Marsh et al. |
| 2003/0015183 A1 | 1/2003 | Sealy et al. |
| 2003/0023367 A1 | 1/2003 | Avery, Jr. et al. |
| 2004/0069284 A1 * | 4/2004 | Corba ........................ 123/563 |

* cited by examiner

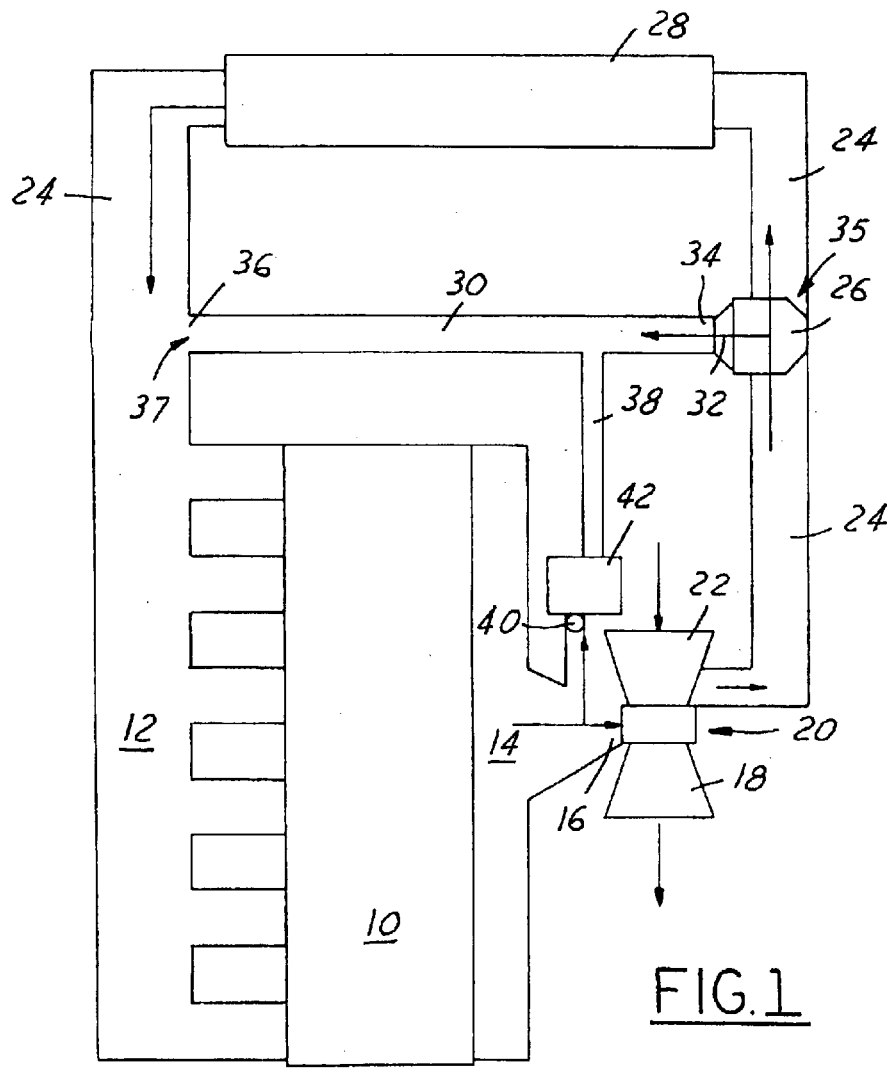
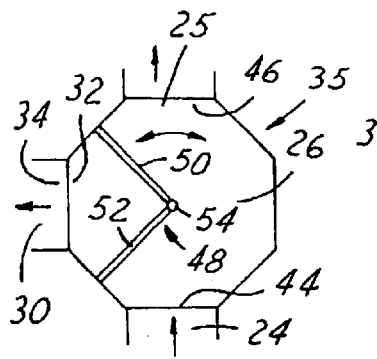
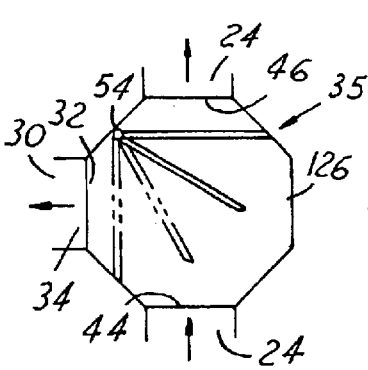
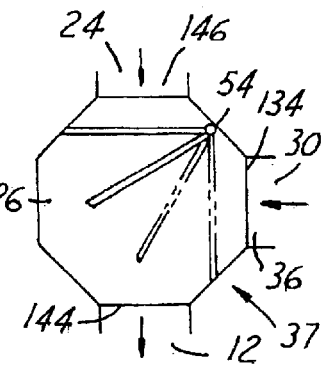

CHARGED AIR INTAKE SYSTEM FOR AN INTERNAL COMBUSTION ENGINE

TECHNICAL FIELD

The field of this invention relates to a charged air intake system for a compression-ignition internal combustion engine utilizing exhaust gas recirculation and a method for reducing formation of intake condensation.

BACKGROUND OF THE DISCLOSURE

Turbo charging or supercharging the intake air into diesel engines is common place for better performance. The charging of the air provides for greater initial density of the air and thus more air for a more powerful combustion cycle. The intake air may, however, be excessively heated during the charging process. Consequently, charge air coolers are common in diesel engines for taking excess heat out of the intake air to prevent premature compression ignition.

Excess cooling of the charged fresh air provides opportunities for condensation to occur in the intake system. The condensation becomes a more serious issue in diesel engines that utilize exhaust gas recirculation. Exhaust gas recirculation is commonly used to reduce engine emissions into the atmosphere. Due to the high sulfur content of diesel fuel, the re-introduction of the exhaust gasses into the cooled intake air provides for condensation of the sulfur in the form of sulfuric acid. The condensation and formation of sulfuric acid has a corrosive effect on the intake system. If the sulfuric acid is introduced into the engine, it can detrimentally act on the cylinder walls and piston rings and produce overall increased engine wear.

While proposed solutions have included the reduction of the amount of sulfur in diesel fuel, use of special corrosive-resistant materials, these solutions are expensive. One other solution is to prevent the condensation of the EGR gasses in the first place to prevent the formation of the sulfuric acid. Previous attempts at preventing condensation have incorporated air dryers to take the moisture out of the intake air before mixing with the EGR gasses which adds considerable expense to the engine.

Other systems provide a bypass of the charge air cooler by bypassing the turbocharger completely. As such, the bypass degrades the efficiency of the turbocharger system by introducing non-charged air into the intake system. Other systems provide completely separate EGR gas conduits which increase the conduit needed for the intake system.

What is needed is charge air intake system that proportions the intake air between the charge air cooler and a bypass duct for maintaining the temperature of the intake air above its dew point to allow introduction of EGR gasses without condensation in an efficient intake passage layout.

SUMMARY OF THE DISCLOSURE

In accordance with one aspect of the invention, a charge air intake system for an internal combustion engine, preferably a diesel engine, includes an air intake plenum for furnishing air to the engine, a first air supply duct for furnishing air to the intake plenum, a charge air cooler mounted in line with the first air supply duct for removing heat from air flowing though the first air supply duct, a second air supply duct for furnishing air to the intake plenum having an upstream junction with the first air supply duct upstream from the charge air cooler, and a downstream junction with the first air supply duct downstream from the charge air cooler. A charge booster preferably in the form of a turbo-charger is mounted upstream of the first and second air supply ducts for increasing the density of air flowing through the ducts from an air inlet. A splitter valve is mounted at one of said upstream or downstream junctions of the first and second air supply ducts for controlling the relative proportion of air flowing through the first and second ducts to the intake plenum.

The charge air bypass system preferably includes an EGR duct having an upstream end connected to an exhaust plenum of the engine and a downstream end connected to the second air supply duct. An EGR valve is operably mounted on the EGR duct.

Preferably the turbo-charger has an exhaust impeller mounted downstream of the exhaust plenum for being driven by exhaust gases. The EGR duct upstream end is between the exhaust plenum and the exhaust impeller. An EGR cooler is desirably operably mounted in line with the EGR duct.

It is also preferable that the splitter valve has at least one closure wall that can selectively close off at least one of the first and second air supply ducts. The splitter valve may be a butterfly valve having a first wall for selectively restricting and closing of the first air supply duct and a second wall for selectively restricting and closing off the second air supply duct. The butterfly valve can be mounted at the upstream junction at the first and second air supply ducts.

In accordance with another aspect of the invention, a charge air intake system for an internal combustion engine includes an air intake plenum for furnishing air to the engine and a charge booster for increasing the density of air furnished to the air intake plenum. A first air supply duct furnishes air from the charge booster to the intake plenum. A charge air cooler is mounted in line with the first air supply duct for removing heat from the charged air flowing through the first air supply duct. A second air supply duct has an upstream junction with the first air supply duct between the charged booster and the upstream end of the charge air cooler. The second air supply duct has a downstream junction with the first air supply duct between the downstream end of the charge air cooler and the intake air plenum. Valving is mounted in the first air supply duct for proportioning the air flowing through the first and second air supply ducts.

In accordance with another aspect of the invention, the invention relates to a method of preventing condensation inside the air intake conduits in a diesel engine utilizing exhaust gas recirculation. The method includes charging the entire fresh air supply for increasing the density of combustion air to the diesel engine, selectively proportioning the charged fresh air supply into first and second flow paths, cooling the fresh air supply passing through the first flow path by a charge air cooler. The method also includes sending air flow in the second flow path to an intake plenum bypassing the charge air cooler, introducing recirculation exhaust gas into the second flow path, and controlling the selective proportioning to maintain the intake manifold temperature above the intake manifold dew point. Preferably, the selective proportioning is achieved by adjustment of valves positioned downstream from where the charges of the entire fresh air supply occurs and upstream of the charge air cooler.

BRIEF DESCRIPTION OF THE DRAWINGS

Reference now is made to the accompanying drawings in which:

FIG. 1 is a schematic diagram of an embodiment of the invention;

FIG. 2 is enlarged top plan view of the valve shown in FIG. 1;

FIG. 3 is a view similar to FIG. 2 of an alternate embodiment of the proportioning valve; and FIG. 4 is a view similar to FIG. 2 illustrating another embodiment of the invention.

DETAILED DESCRIPTION OF THE PREFERRED EMBODIMENT

Referring now to FIG. 1, a diesel engine 10 has a conventional intake manifold 12 and exhaust manifold 14. The exhaust manifold has a pipe section 16 leading to a turbo charger exhaust impeller section 18 of turbocharger 20. An intake impeller section 22 is driven and charges fresh air into intake duct 24.

Intake duct 24 has a proportioning valve 26 mounted therein and a charge air cooler 28 downstream of the valve 26. Valve 26 has a second outlet 32 leading to a second or bypass duct 30. In other words, bypass duct 30 has it upstream end 34 in communication with duct 24 upstream of charge air cooler 2B. In addition, bypass duct 30 has its downstream end 36 connecting with first duct 24 downstream of charge air cooler 28 leading to the intake manifold 12. These upstream and downstream junctions are labeled 35 and 37.

The exhaust manifold also has an EGR valve 40 leading to an EGR cooler 42 which leads to EGR duct 38. Duct 38 is connected to bypass duct 30 for delivery the EGR gasses to the bypass duct 30.

As shown in FIG. 2, the bypass proportioning valve 26 is in line with duct 24 such that its inlet 44 and outlet 46 form part of duct 24. The second outlet 32 is between the inlet 44 and first outlet 46. The valve may use a butterfly shaped valve 48 having two wall sections 50 and 52 for selectively closing the outlets 46 and 32. The wall sections 50 and 52 are affixed with respect to each other and pivot about axis 54.

FIG. 3 discloses an alternate valve 126 which also provides for proportional flow through the first and second outlets 32 and 46. In this embodiment, the wall sections 50 and 52 are also affixed with respect to each other but have a pivot axis 54 between the first and second outlets 46 and 32 for proportionately restricting or closing off the first and second outlets 32 and 46.

FIG. 4 discloses an alternate position for valve 126 positioned in duct 124 downstream from charge air cooler and connected to the downstream end 36 of bypass duct 30. In this embodiment the axis 54 is interposed between the inlet 146 of duct 24 and the bypass duct inlet 134. The walls 50 and 52 of the valve proportionately restrict and close off flow through these two inlets where they join at outlet 144 leading to intake manifold 12.

In operation, the entire intake of fresh air is charged by impeller section 22 of turbocharger 20. The intake air is then divided proportionately between the duct 24 leading to the charge air cooler and the bypass duct 30. EGR gasses from exhaust manifold 14 pass through EGR valve 40, EGR cooler 42 and into bypass duct 30 where it mixes with bypass air from valve 26.

The bypass air and EGR gasses are then remixed with cooled air from charge air cooler 28 where it flowed into intake manifold 12 and into diesel engine 10 for combustion.

The proportioning of the valve 26 can be determined through known control units and programming of humidity, temperature and dew point to maintain the temperature of the mixed air in the intake manifold 12 above the manifold air dew point. As such, if less air is needed to go through cooler 28, the proportioning valve 26 is moved to allow more air to enter bypass duct 30 and less to pass through cooler 28 via duct 24. Even with full flow through the bypass duct 30, there should be no restriction of the EGR gasses from duct 38 mixing into duct 30.

In this fashion, condensation within the intake system is eliminated without decrease in the intake manifold pressure or air density. Furthermore, EGR gasses are re-introduced in the intake system without the need for a completely separate EGR conduit system or without the need for expensive specialized corrosive resistant materials incorporated into the intake conduits or the addition of expensive air dryers in an efficient intake layout.

Other variations and modifications are possible without departing from the scope and spirit of the present invention as defined by the appended claims.

The embodiments in which an exclusive property or privilege is claimed are defined as follows:

1. A charge air intake system for an internal combustion engine, comprising:

an air intake plenum for furnishing air to the engine;

a first air supply duct for furnishing air to the intake plenum;

a charge air cooler mounted in line with said first air supply duct for removing heat from air flowing though said first air supply duct;

a second air supply duct for furnishing air to the intake plenum having an upstream junction with the first air supply duct upstream from said charge air cooler and a downstream junction with the first air supply duct downstream from said charge air cooler;

a charge booster mounted upstream of said first and second air supply ducts for increasing the density of air flowing through said ducts from an air inlet;

a splitter valve mounted at one of said upstream or downstream junction of said first and second air supply ducts for controlling the relative proportion of air flowing through said first and second ducts to said intake plenum; and an EGR duct having an upstream end connected to an exhaust plenum of said engine and a downstream end in fluid connection to said air intake plenum downstream of said bypass valve and bypassing said charge air cooler.

2. A charge air intake system for an internal combustion engine, comprising:

an air intake plenum for furnishing air to the engine;

a first air supply duct for furnishing air to the intake plenum;

a charge air cooler mounted in line with said first air supply duct for removing heat from air flowing though said first air supply duct;

a second air supply duct for furnishing air to the intake plenum having an upstream junction with the first air supply duct upstream from said charge air cooler and a downstream junction with the first air supply duct downstream from said charge air cooler;

a charge booster mounted upstream of said first and second air supply ducts for increasing the density of air flowing through said ducts from an air inlet;

a splitter valve mounted at one of said upstream or downstream junction of said first and second air supply ducts for controlling the relative proportion of air flowing through said first and second ducts to said intake plenum;

an EGR duct having an upstream end connected to an exhaust plenum of said engine and a downstream end connected to said second air supply duct; and an EGR valve operably mounted on said EGR duct.

3. A charge air bypass system as defined in claim 2 further comprising:

said charge booster being a turbo-charger having an exhaust impeller mounted downstream of said exhaust plenum for being driven by exhaust gases;

said EGR duct upstream end being between said exhaust plenum and said exhaust impeller; and an EGR cooler being operably mounted in line with said EGR duct.

4. A charge air intake system as defined in claim 2 further comprising:

said splitter valve having at least one closure wall that can selectively close off at least one of said first and second air supply ducts.

5. A charge air intake system as defined in claim 4 further comprising:

said splitter valve being a butterfly valve having a first wall for selectively restricting and closing of the first air supply duct and a second wall for selectively restricting and closing off the second air supply duct.

6. A charge air intake system as defined in claim 5 further comprising:

said butterfly valve being mounted at said upstream junction of said first and second air supply ducts.

7. A charge air intake system for an internal combustion engine comprising:

an air intake plenum for furnishing air to the engine;

a charge booster for increasing the density of air furnished to the air intake plenum;

a first air supply duct for furnishing air from the charge booster to the intake plenum;

a charge air cooler mounted in line with the first air supply duct for removing heat from the charged air flowing through said first duct;

a second air supply duct having an upstream junction with the first air supply duct between the charged booster and the upstream end of the charge air cooler and a downstream junction with the first air supply duct between the downstream end of the charge air cooler and the intake air plenum;

valving mounted in said first air supply duct for proportioning the air flowing through said first and second air supply ducts; and an EGR duct having an upstream end connected to an exhaust plenum of said engine and a downstream end in fluid connection to said air intake plenum downstream of said valve and bypassing said charge air cooler.

8. A charge air intake system for an internal combustion engine comprising:

an air intake plenum for furnishing air to the engine;

a charge booster for increasing the density of air furnished to the air intake plenum;

a first air supply duct for furnishing air from the charge booster to the intake plenum;

a charge air cooler mounted in line with the first air supply duct for removing heat from the charged air flowing through said first duct;

a second air supply duct having an upstream junction with the first air supply duct between the charged booster and the upstream end of the charge air cooler and a downstream junction with the first air supply duct between the downstream end of the charge air cooler and the intake air plenum;

valving mounted in said first air supply duct for proportioning the air flowing through said first and second air supply ducts;

an EGR duct having an upstream end connected to an exhaust plenum of said engine and a downstream end connected to said second air supply duct; and an EGR valve operably mounted on said EGR duct.

9. A charge air intake system as defined in claim 8 further comprising:

said charge booster being a turbo-charger having an exhaust impeller mounted downstream of said exhaust plenum for being driven by exhaust gases;

said EGR duct upstream end being between said exhaust plenum and said exhaust impeller; and an EGR cooler being operably mounted in line with said EGR duct.

10. A method of preventing condensation inside the air intake conduits in a diesel engine utilizing exhaust gas recirculation; said method comprising:

charging the entire fresh air supply for increasing the density of combustion air to the diesel engine;

selectively proportioning the charged fresh air supply into first and second flow paths;

cooling said fresh air supply passing through said first flow path by a charge air cooler;

sending air flow in said second flow path to an intake plenum bypassing said charge air cooler;

introducing recirculation exhaust gas into said second flow path; and controlling said selective proportioning to maintain the intake manifold temperature above the intake manifold dewpoint.

11. A method as defined in claim 10 further comprising:

said selective proportioning being achieved by adjustment of valves positioned downstream of where the charges of the entire fresh air supply occurs and upstream of said charge air cooler.

12. A method of preventing condensation inside the air intake conduits in a diesel engine utilizing exhaust gas recirculation; said method comprising:

charging the entire fresh air supply for increasing the density of combustion air to the intake plenum of the diesel engine;

selectively proportioning the charged fresh air supply into first and second flow paths;

cooling said fresh air supply passing through said first flow path by a charge air cooler;

sending air flow in said second flow path to an intake plenum bypassing said charge air cooler;

introducing recirculation exhaust gas into said charged fresh air supply with said recirculation exhaust gas bypassing said charge air cooler; and controlling said selective proportioning of said first and second flow paths to maintain the intake manifold temperature above the intake manifold dewpoint.

13. A method as defined in claim 12 further comprising:

said selective proportioning being achieved by adjustment of valves positioned downstream of where the charges of the entire fresh air supply occurs and upstream of both said charge air cooler and where said recirculation exhaust gas is introduced into said charged air supply.

* * * * *

UNITED STATES PATENT AND TRADEMARK OFFICE
CERTIFICATE OF CORRECTION

PATENT NO. : 6,868,840 B2  
DATED : March 22, 2005  
INVENTOR(S) : Brian Andrew Lewallen It is certified that error appears in the above-identified patent and that said Letters Patent is hereby corrected as shown below:

Title page,
Item [57], ABSTRACT,
Line 6, "turbo charger" delete "furnished", insert -- furnishes --

Column 1,
Line 48, after "needed is", insert -- a --

Column 2,
Line 20, after "closing" delete "of", insert -- off --

Column 3,
Line 15, after "has" delete "it", insert -- its --
Line 23, after "delivery", insert -- of --

Column 5,
Line 13, after "closing" delete "of", insert -- off --

Signed and Sealed this

Twelfth Day of July, 2005

JON W. DUDAS
*Director of the United States Patent and Trademark Office*